United States Patent [19]
Obler et al.

[11] 3,818,814
[45] June 25, 1974

[54] AIR CONDITIONING SYSTEM AND COMPONENT THEREFOR DISTRIBUTING AIR FLOW FROM OPPOSITE DIRECTIONS

[75] Inventors: Henry D. Obler, Lanham, Md.; Hugh B. Bauer, Washington, D.C.

[73] Assignee: The United States of America as represented by the Administrator of the National Aeronautics and Space Administration, Washington, D.C.

[22] Filed: Apr. 28, 1972

[21] Appl. No.: 248,471

[52] U.S. Cl. .................................... 98/39, 236/49
[51] Int. Cl. ............................................ F24f 13/08
[58] Field of Search ............ 98/33 R, 39, 37, 40 C; 265/22, 34; 236/16, 9 A, 49; 237/13

[56] References Cited
UNITED STATES PATENTS
2,495,861  1/1950  Newton ........................... 165/22 X Primary Examiner—William E. Wayner
Attorney, Agent, or Firm—R. F. Kempf; John R. Manning

[57] ABSTRACT

A novel air conditioning system and automatic air volume control apparatus therefor is disclosed for distribution of air flow from two opposite directions. The air conditioning system, in the preferred inventive embodiment, comprises a plurality of separate air conditioning units coupled to a common supply duct such that air may be introduced into the supply duct in two opposite flow directions. A plurality of outlets such as registers or auxiliary or branch ducts communicate with the supply duct and valve means are disposed in the supply duct at at least some of the outlets for automatically channelling a controllable amount of air from the supply duct to the associated outlet regardless of the direction of air flow within the supply duct.

In a preferred inventive embodiment, the valve means comprises an automatic air volume control apparatus for distribution within the air supply duct into which air may be introduced from said two opposite directions. The apparatus incorporates a first air scoop disposed within the supply duct which deflects a pre-determined amount of any air flowing therethrough in one direction towards an outlet. A second air scoop is likewise disposed in the supply duct which serves to deflect a pre-determined amount of any air flowing therethrough in the opposite direction towards the same outlet. Finally, a freely swinging movable vane is disposed in the supply duct in the path of the deflected air flows from opposite directions, movement of the vane automatically channelling into the associated outlet only the deflected air flow which has the higher relative pressure.

12 Claims, 5 Drawing Figures

PATENTED JUN 25 1974      3,818,814

AIR CONDITIONING SYSTEM AND COMPONENT THEREFOR DISTRIBUTING AIR FLOW FROM OPPOSITE DIRECTIONS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention generally relates to air conditioning systems and particularly concerns an air conditioning system and a component apparatus therefor capable of automatically effecting distribution of air flow within a supply duct, which air flow may be introduced from two opposite directions.

In many technological fields such as the computer sciences and the electrical and chemical manufacturing arts, it is necessary to maintain a very closely controlled air temperature and humidity environment. Deviations in temperature and/or humidity of just several per cent from a given norm in these areas could cause gross errors to arise in the manufacturing processes, and/or in the computer calculations and operations.

The current state of air conditioning technology can usually maintain such close temperature and humidity tolerances, but not always at an economical cost nor with sufficiently high reliability. For example, if a particular manufacturing or operating area could adequately be serviced, under normal conditions, by a single ten ton air conditioning unit, the usual approach so as to maintain close temperature tolerances is to provide two such units, one unit for normal operation, the other for stand-by or emergency use. The inefficiency and high cost of a totally redundant system of this nature should be obvious. In addition, a certain time lag normally is involved between failure of the normal unit and switching in of the emergency unit, which time lag can occasion a temperature variation beyond the tolerable range.

Further, with a redundant system of the type above-described, the plurality of air conditioning units are oftentimes connected to a plurality of separate and distinct air supply ducts, occasioning a still further increase in cost of the over-all system. In those instances where a single common supply duct is provided for the plurality of air conditioning units, the air conditioning units normally must be maintained in the same area or physical location so that the air flow therefrom always enters the common supply duct in the same direction. This is necessary since the various air volume control devices and the like disposed within the supply duct as currently utilized today are not capable of handling and distributing an air flow from a supply duct which may come from two opposite directions. As should be appreciated, the overall efficiency of a system could be markedly increased if the plurality of units provided could be disposed at different physical locations so as to get a more even and balanced flow of air into the manufacturing or operating area.

SUMMARY OF THE INVENTION

In view of the afore-mentioned background of the prior art, it is a primary objective of the instant invention to provide an air conditioning system which utilizes a plurality of separate air conditioning units that can be disposed at different physical locations, but which units are coupled to a common supply duct that is constructed, along with its air distribution components therefor, so as to be able to handle air introduced into the supply duct in two opposite flow directions.

It is a further objective of the instant invention to provide an automatic air volume control apparatus for utilization in a system of the type above-described which is capable of introducing a controllable amount of conditioned air into a register or diffuser with air coming from either one of two opposite directions in a common supply duct.

It is still another objective of the instant invention to provide such an automatic air volume control apparatus which can introduce a controllable amount of conditioned air into a branch duct with air coming from either one of two opposite directions in a main duct which supplies the branch duct.

Yet another overall objective of the instant invention is the provision of a novel air conditioning system and air distribution components therefor, which system is capable of maintaining close temperature and/or humidity control, at an economical cost.

It is still a further objective of the instant invention to provide an overall air conditioning system with redundant capabilities but constructed in a fashion such that switchover between a main or normal flow and an emergency or stand-by flow is effected automatically and in a fashion wherein the volume of air flow into the controlled environment area can remain constant under such circumstances.

These objectives, as well as others which will become apparent as the description proceeds, are implemented by the instant invention which, in one aspect thereof, will be seen to comprise a novel air conditioning system which incorporates a plurality of separate air conditioning units coupled to a common supply duct such that air may be introduced into the supply duct in two opposite flow directions. A plurality of outlets, branch ducts, or registers, communicate with the supply duct and valve means are disposed in the supply duct at at least some of the outlets. These valve means, in the preferred inventive embodiment, effect an automatic channelling of a controllable amount of air from the supply duct to the associated outlet regardless of the direction of air flow within the supply duct.

In the overall system as above-described, the plurality of separate air conditioning units can be located at different physical positions along the common supply duct in a fashion such that at least one of the air conditioning units introduces air into the supply duct in one direction while at least one other of the units introduces air into the supply duct in the opposite direction. A control means is provided so as to control the flow volume of one of the units as a function of the flow volume of the other of the units. Specifically, and in a preferred inventive embodiment, each of the air conditioning units is contemplated to have a low and a high speed mode of operation with all units normally operating together in a low speed mode. The control means above-discussed can serve to detect when the air flow output from one of the units falls below some predetermined value and, in response to this detection, serves to switch the other unit into the high speed mode. No adjustments of the valve means provided at the various outlets are required, since such valves or distribution apparatus are capable of handling air flow from either of two opposite directions.

The instant invention, in yet another aspect thereof, comprises an automatic air volume control apparatus of the type above-described for disposition within the common air supply duct into which air may be introduced from two opposite directions. The apparatus, as afore-stated, can channel, irrespective of flow direction, a controlled amount of air from the supply duct into an outlet communicating therewith.

The automatic air volume control apparatus preferably comprises a first means, such as an air scoop which is adjustable, which is disposed in the supply duct so as to deflect a pre-determined amount of any air flowing therethrough in one direction towards the outlet. A second means, or adjustable air scoop, is disposed in the supply duct for deflecting a pre-determined amount of any air flowing therethrough in the opposite direction towards the same outlet. Finally, a third means which preferably comprises a hingedly mounted pivotal vane is disposed in the supply duct between the first and second air scoops right at the region of communication with the supply duct of the outlet. This mechanism is therefore disposed in the path of the deflected air flows from opposite directions and, due to swinging movement of the freely pivotal vane, serves to automatically channel into the outlet only the deflected air flow having the higher relative pressure.

BRIEF DESCRIPTION OF THE DRAWINGS

The invention will be better understood and further features and advantages thereof will become apparent from the following detailed description of a preferred inventive embodiment, such description making reference to the appended drawings, wherein.

DETAILED DESCRIPTION OF THE DRAWINGS

Figure 1:
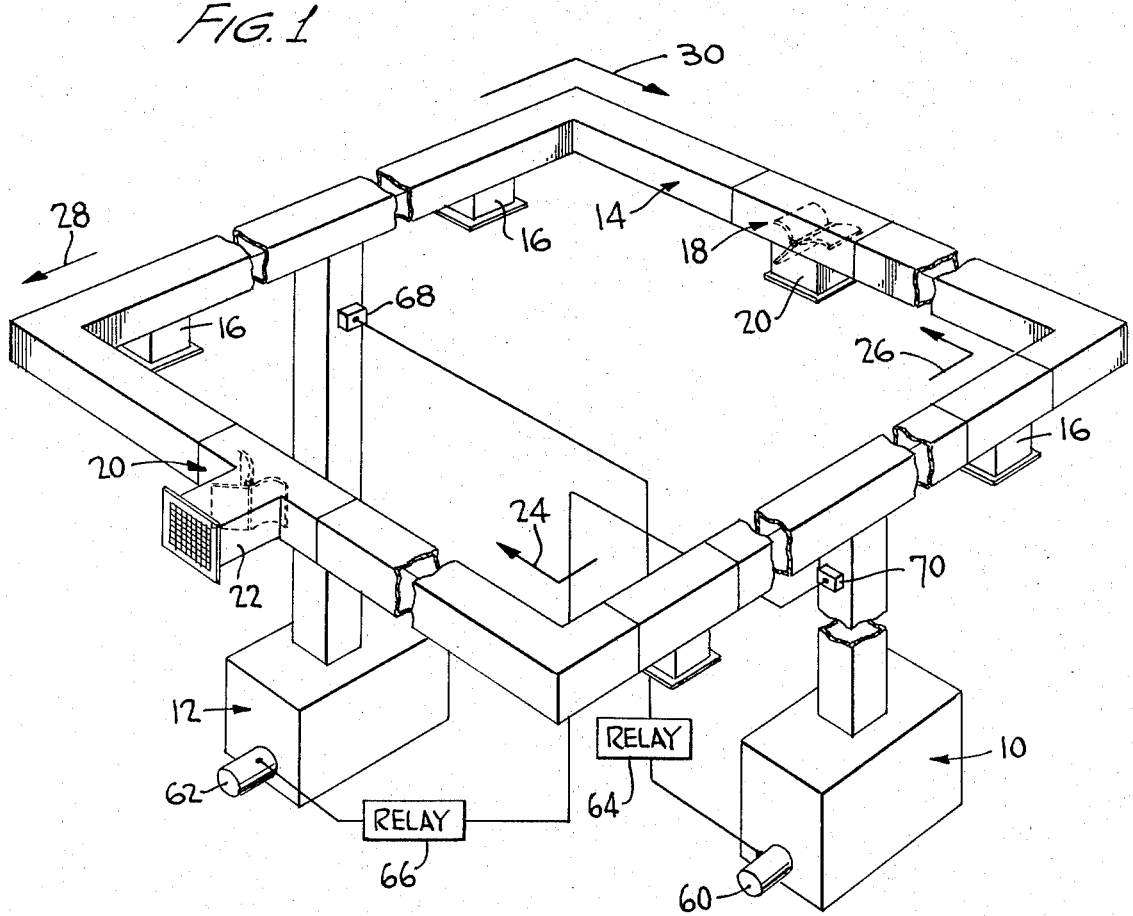
FIG. 1 is a schematic illustration of an overall air conditioning system constructed in accordance with the principles of the instant invention.

Referring now to the drawings and particularly to FIG. 1 thereof, a schematic illustration of the overall novel air conditioning system of the instant invention can be seen. The system comprises a plurality of what is broadly termed air conditioning units such as units 10 and 12 which are preferably disposed at physically separate locations within the system. Air conditioning units 10 and 12 can be of any commercially available type and operate to condition the air and specifically the temperature and/or humidity thereof.

The system depicted in FIG. 1 is contemplated to be provided within some environmental area requiring very close temperature and/or humidity tolerances and a single main air supply duct 14 is contemplated to be utilized. Duct 14 can be of any standard type, such as constructed of sheet metal and having a rectangular cross-sectional configuration, for example. Communicating with the main air supply duct 14 are a plurality of auxiliary ducts, branch ducts, and/or registers such as is designated by reference numeral 16, for example. These branch ducts or registers will herein be termed "outlets" and can be disposed at any of numerous locations along the main air supply duct 14, leading to different specific areas in the room or other air conditioned and controlled environment. Disposed at various ones, if not all, of the outlets are automatic air volume control apparatus or valve mechanisms such as mechanisms 18 and 20, for example, these valve mechanisms or means serving to automatically channel the controllable amount of air from the main supply duct 14 into an associated outlet, such as outlet 20' and 22 which constitute a register and a branch duct, respectively, in a fashion irrespective of the direction of air flow within the supply duct. The specific constructional details of the valve means 18 and 22 will be described hereinbelow.

Continuing, the plurality of air conditioning units 10 and 12 are connected to the main supply duct 14 in a fashion such that air may be introduced therein from two opposite directions. For example, air flow introduced in the main supply duct 14 from air conditioning unit 10 would travel within the duct 14 in the direction of arrows 24 and 26. On the other hand, air introduced into the supply duct 14 from air conditioning unit 12 would travel within the duct in a flow direction represented by arrows designated 28 and 30.

These different flow directions are "opposite" flow directions, in the broad sense, within the main supply duct 14, though it should be understood that the term "opposite" flow directions does not necessarily require the two flow directions to be diametrically opposite, but merely requires the flow directions to oppose one another as will be discussed hereinbelow with respect to the actual construction of the valve means or air volume control apparatus 18 and 20.

Air flow from air conditioning unit 10 in the direction of arrows 24 and 26 within the main supply duct 14 can be termed a "normal" flow direction and, as such, air conditioning unit 10 could supply all of the various outlets 16 disposed along the supply duct 14. Of course, each of the valve means or air volume control apparatus 18 and 22 provided at the various outlets would serve to control the actual volume of flow from the supply duct 14 that is channelled into the outlets. Thus, the further away an outlet is from the source of air supply, such as air conditioning unit 10, the larger must be the percentage of existing air flow at that location which is captured and channelled to the outlet. This is a conventional practice, as should be appreciated, of "balancing" outlets along an air conditioning supply duct.

Considering the system from the standpoint of air conditioning unit 12, and the opposite direction of air flow in the supply duct 14 introduced thereby, the same "balancing" techniques at the various outlets are required. Thus, each of the valve means or air volume control apparatus 18 and 20 provided at the various outlets must also be capable of handling air flow coming from arrows 28 and 30 and channelling a pre-determined "balanced" amount of such air flow into the associated outlets. Thus, from a functional point of view, the automatic air volume control apparatus, such as apparatus 18 and 20, disposed within the air supply duct 14 into which air may be introduced from the above-described two opposite directions must be capable of channelling, irrespective of flow direction, a controlled amount of air from the supply duct into the outlet communicating therewith.

At this juncture, reference is made to the actual detailed construction of the automatic air volume control apparatus, such as apparatus 18 and 20, and attention is directed to FIGS. 2 through 5 of the appended drawings. The apparatus will be seen to comprise first means, such as air scoop or vane 32 disposed in the supply duct 14 for deflecting a pre-determined amount of any air flowing therethrough, in the direction of arrow 34, for example, towards an outlet 36. The position of the first means of air scoop 32 within the air supply duct 14 is manually adjustable by means of an adjusting rod 38 so that the amount of air captured by the air scoop 32 flowing in the direction of arrow 34 can be varied. It is by this mechanism that the air conditioning system, as a whole, can be balanced.

Figure 3:
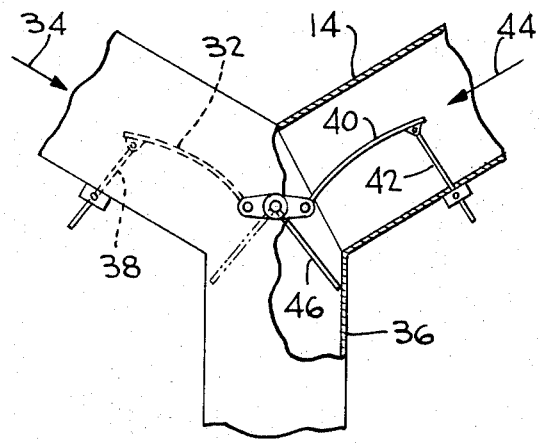
FIG. 3 is a schematic illustration of still another embodiment of the automatic air volume control apparatus.
Figure 4:
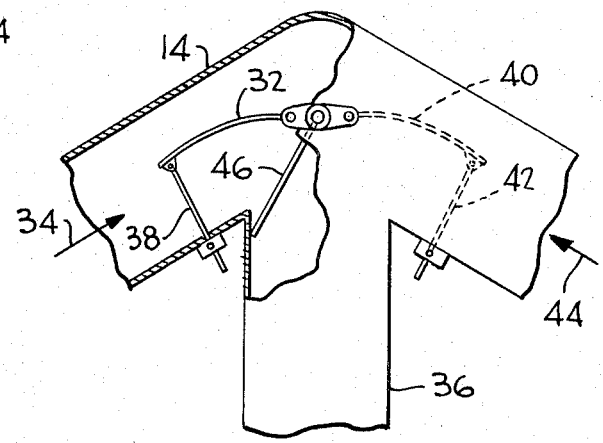
FIG. 4 is a schematic illustration of yet another embodiment of the automatic air volume control apparatus.

A second means or air scoop 40 is disposed opposite the air scoop 32 and is of similar construction, including an adjusting rod 42 as is illustrated. The second means or air scoop 40 deflects a pre-determined amount of any air flowing in the direction of arrow 44 towards the outlet 36. As should be appreciated, the air flow within supply duct 14 represented by arrows 34 and 44, respectively, is in opposite directions. More particularly, the two air flow directions 34 and 44 are counter to one another, though not necessarily diametrically opposed, as can be appreciated from a review of FIGS. 3 and 4 representing modified embodiments of the automatic air volume control apparatus in which the two flow directions are slightly at an angle to one another, though still opposed.

Continuing, the automatic air volume control apparatus further includes a third means such as vane 46, also disposed in the supply duct 14 between the first and second means or air scoops 32 and 40 respectively. The third means or vane 46 is in the path of any air flow deflected by air scoops 32 and 40 and serves to automatically channel into outlet 36 only the deflected air flow having the higher relative pressure. The manner in which this is accomplished can perhaps best be appreciated from a review of FIG. 5 depicting a more detailed perspective illustration of the air volume control apparatus.

Figure 2:
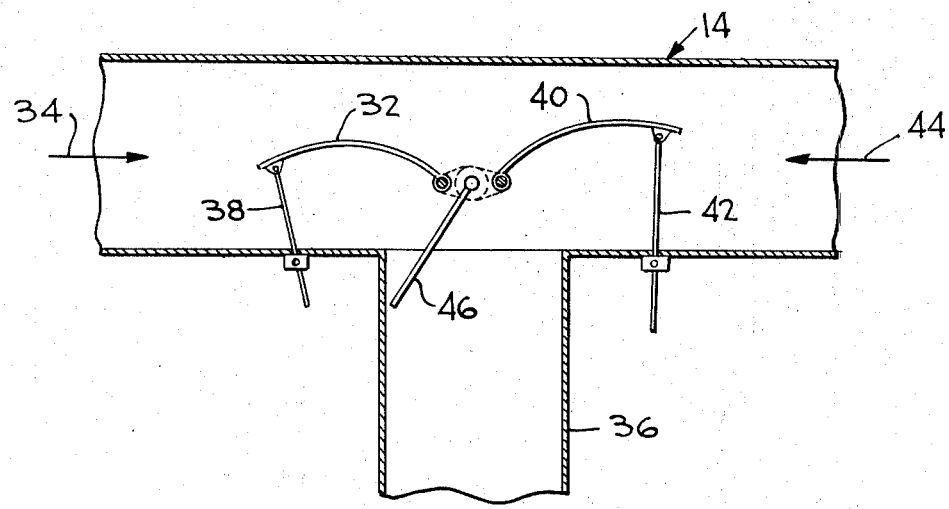
FIG. 2 is a schematic illustration of one embodiment of an automatic air volume control apparatus for the system of FIG. 1.

In this respect, the third means or vane 46 is hingedly mounted about a rod 48 within the supply duct 14 for free swinging pivotal movement about an axis defined by the rod 48. Thus, due to the free swinging pivotal movement, the higher pressure air flow as between air flowing in directions 34 and 44, respectively, will cause the third means or vane 46 to swing away therefrom, thus opening a communication passage to outlet 36. As depicted in FIGS. 2 through 4, for example, air flow coming from the direction of arrow 44 is presumed to be of higher pressure than air flow, if any, that exists in the direction of arrow 34. Thus, the third means or vane 46 is depicted in a position wherein the vane 46 has freely swung to abut against an inner wall of the outlet 36, thus opening a passage for air flow in the direction of arrow 44 through the outlet 36 while, at the same time, blocking any air from entering outlet 36 coming from the direction of arrow 34. As should be appreciated, if the pressure of air flowing in the direction of arrow 34 were higher than the pressure of air, if any, flowing in the direction of arrow 44, the position of the third means or vane 46 would be swung toward the right when viewing FIGS. 2 through 4.

Figure 5:
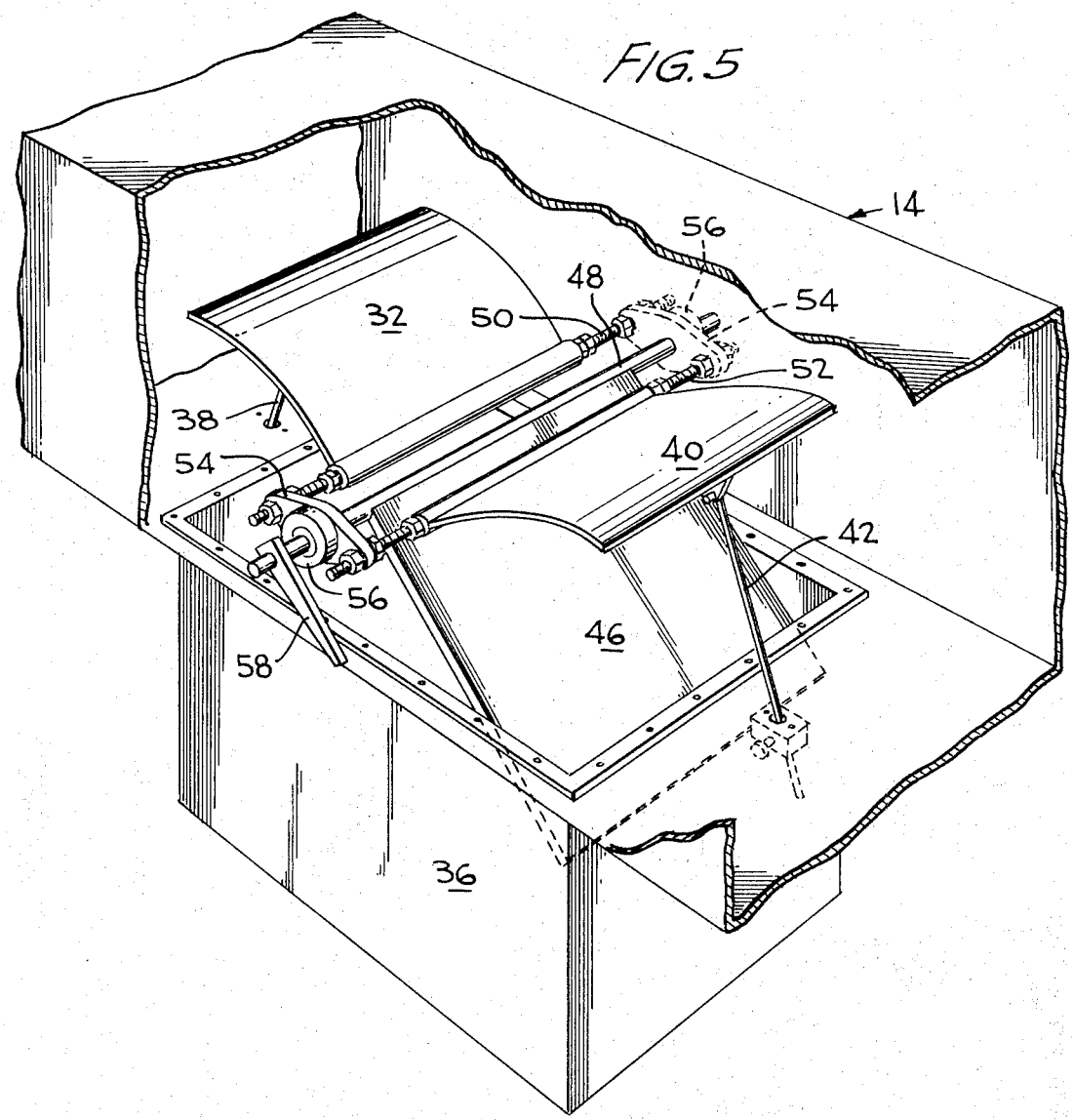
FIG. 5 is a perspective illustration, partially broken away for illustrative clarity, of the preferred structural manifestation of the automatic air volume control apparatus of the instant invention.

Continuing with the detailed description of the automatic air volume control apparatus and again with specific reference to FIG. 5, each of the two air scoops 32 and 40 are likewise mounted on axels or rods 50 and 52, respectively. These rods 50 and 52 terminate in a flange 54 provided to either side of the supply duct 14 wherein the axels or rods 50 and 52 are fixedly maintained. On the other hand, rod 48 to which the vane 46 is attached is pivotally mounted within the flange 54 in a bearing arrangement 56. In this manner, free swinging movement of the vane can be effected and, in this respect, it should be appreciated that the disposition of the overall apparatus can be such that the pivotal axis of vane 46 defined by rod 48 can either be horizontal, or vertical, without detracting from the free swinging movement of vane 46.

The rod 48 further has attached thereto an indicating mechanism 58 disposed on the outside of the air supply duct 14 so that an observer of the system could ascertain the position of vane 46 and thus the direction of air flow within the supply duct. The indicating mechanism 58 further functions as a mechanism by which the position of vane 46 can be manually controlled.

With an understanding of the details of the automatic air volume control apparatus now firmly in mind, attention can once again be directed to FIG. 1 of the drawings wherein a description of the operation of the overall air conditioning system can be completed.

Initially, let it be assumed that the normal or usually operating air conditioning unit is that unit designated by reference numeral 10 and that air conditioning unit 12 is not operative. In this instance, the entire air flow within the system would be in the direction of arrows 24 and 26 and each of the automatic air volume control apparatus such as apparatus 18 and 20 would be such that the third means or vane 46 therein assume the position as depicted in FIGS. 2 through 4 of the drawings, i.e. flow direction 44 being the normal or operative flow direction in this instance. Accordingly, a select pre-determined amount of air flowing within supply duct 14 would be directed out of each of the various outlets of the system and, as afore-stated, the overall system would be balanced for flow in this assumed direction by means of adjusting the position of the air scoop 40 within the supply duct 14. If the air conditioning unit 10 should fail for any reason, the other unit 12 could be activated, automatically if desired, so that air flow within the common supply duct 14 would then be in the direction of arrows 28 and 30. In this instance, the vanes 46 of each of the automatic air volume control apparatus provided would swing toward the right when viewing FIGS. 2 through 4, thus allowing a pre-determined amount of air flowing in the duct 14 from direction 34 to exit the individual outlets. Again, the amount of air exiting a specific outlet 36 in response to an air flow direction generated by unit 12 and designated by arrows 34 in FIGS. 2 through 4 is controlled through an adjustment of the position of the air scoop 32. The closer is an automatic air volume control apparatus to air conditioning unit 12 within the supply duct 14, the lesser the amount of air would be desired to be captured by scoop 32, for example.

It is not necessary, however, to operate the system of FIG. 1 in the fashion above-described wherein only one, or the other, of the air conditioning units 10 and 12 are operative. Both such units could, if desired, operate simultaneously in the following fashion.

Each of the air conditioning units 10 and 12 incorporates a motor 60 and 62, respectively, which effects at least a low speed operational mode and a high speed operational mode of the respective air conditioning units. Operation of the motors 60 and 62, and specifically control over the motor speed, is effected by an associated relay 64 and 66, respectively. Actuation of relays 64 and 66 is controlled by a static pressure switch 68 and 70, respectively, which switches are disposed in the output of the opposite air conditioning unit. Thus, control over the speed of motor 60 of air conditioning unit 10 is ultimately effected by the output pressure of air flowing from air conditioning unit 12 as sensed by the static pressure switch 68. Similarly, operation of motor 62 of air conditioning unit 12 is controlled by a static pressure switch 70 which senses the output of air conditioning unit 10.

In the preferred inventive embodiment, air conditioning units 10 and 12 operate simultaneously and each of the units 10 and 12 operate in the low output mode due to a low speed setting of the respective motors 60 and 62. If, for some reason, such as failure or maintenance, for example, air conditioner unit 12 should become inoperative, the static pressure switch 68 sensing the output thereof would detect when the output fell below some pre-determined value and, in response to such detection, would trip relay 64 to cause motor 60 and thus air conditioner unit 10 to switch into the high speed mode so that the amount of air exiting the various outlets of the common main supply duct 14 could still remain constant. The operation is similar to that just now described in the event that air conditioning unit 10, rather than unit 12, failed, was taken out of service, or otherwise was rendered inoperative.

As should now be apparent, the objects initially set forth at the outlet of this Specification have been successfully achieved. Accordingly,

What is claimed is:

1. An air flow system comprising a plurality of separate air flow producing units disposed at different physical locations and coupled to a supply duct at different points such that air may be introduced into the supply duct from two opposite directions, wherein at least one of said air flow producing units introduces air into said supply duct from one direction while at least one other of said units introduces air into said supply duct from the opposite direction; a plurality of outlets communicating with the supply duct; means to control the flow-volume of said one of said units as a function of the flow of said other of said units; and valve means disposed in the supply duct at at least some of the outlets for automatically channeling a controllable amount of air from the supply duct to the associated outlet regardless of the direction of air flow within the supply duct.

2. The system of claim 1 wherein said valve means comprises:
first means disposed in the supply duct for deflecting a predetermined amount of any air flowing therethrough in one direction towards the outlet communicating therewith;
second means disposed in the supply duct for deflecting a predetermined amount of any air flowing therethrough in the opposite direction towards the outlet; and
third means disposed in the supply duct in the path of the deflected air flows from opposite directions for automatically channeling into the outlet only the deflected air flow having the higher relative pressure.

3. The system as defined in claim 2, wherein said first and second means comprise scoops respectively disposed in the supply duct to either side of the outlet communicating therewith, and wherein said third means comprises a vane disposed in the supply duct between said scoops immediately at the region of communication of the outlet with the supply duct.

4. The system as defined in claim 3, wherein said vane is hingedly mounted within the supply duct for free swinging pivotal movement about an axis between first and second positions at which the deflected air flows from opposite directions are respectively blocked from exiting the outlet.

5. The system as defined in claim 3, wherein each scoop is adjustably movable within the supply duct to control the amount of air deflected thereby.

6. The system as defined in claim 4, wherein said axis of pivotal movement of said vane extends in one of the vertical and horizontal directions.

7. A system as defined in claim 1 wherein said one and said other of said units have at least a low speed mode and a high speed mode, said units normally operating together in said low speed mode, and wherein said means to control the flow volume detects when the air flow output from said other unit falls below a predetermined value and switches said one unit into said high speed mode in response thereto.

8. An air conditioning system comprising a plurality of separate air conditioning units coupled to a common supply duct such that air may be introduced into the supply duct in two opposite directions, at least one of said air conditioning units introducing air into said supply duct in one direction while at least one other of said units introduces air into said supply duct in the opposite direction; a plurality of outlets communicating with the supply duct; valve means disposed in the supply duct at at least some of the outlets for automatically channeling a controllable amount of air from the supply duct to the associated outlet regardless of the direction of air flow within the supply duct; and means to control the flow volume of said one of said units as a function of the flow volume of said other of said units.

9. A system as defined in claim 8, wherein said one and said other of said units have at least a low speed mode and a high speed mode, said units normally operating together in said low speed mode, and wherein said means to control the volume detects when the air output from said other unit falls below a predetermined value and switches said one unit into said high speed mode in response thereto.

10. The system of claim 8 wherein said valve means comprises:
first means disposed in the supply duct for deflecting a predetermined amount of any air flowing therethrough in one direction towards the outlet communicating therewith;

second means disposed in the supply duct for deflecting a predetermined amount of any air flowing therethrough in the opposite direction towards the outlet; and third means disposed in the supply duct in the path of the deflected air flows from opposite directions for automatically channeling into the outlet the deflected air flow having the higher relative pressure.

11. The system of claim 10, wherein said first and second means comprise adjustably movable scoops respectively disposed in the supply duct to either side of the outlet communicating therewith to control the amount of air deflected thereby, and wherein said third means comprises a vane hingedly mounted within the supply duct between said scoops and disposed immediately at the region of communication of the outlet with the supply duct for free swinging pivotal movement about an axis between first and second position at which the deflected air flows from the opposite directions are respectively blocked from exiting the outlet.

12. The system of claim 11, further including an indicating mechanism disposed on the outside of said supply duct and generally attached to said vane in the area of said axis to permit manual control of said vane.

* * * * *